US012656938B2

(12) United States Patent
Zhao et al.

(10) Patent No.: US 12,656,938 B2
(45) Date of Patent: Jun. 16, 2026

(54) CONTENT POSTING METHOD, DEVICE AND COMPUTER-READABLE STORAGE MEDIUM

(71) Applicant: Beijing Zitiao Network Technology Co., Ltd., Beijing (CN)

(72) Inventors: Jiayi Zhao, Beijing (CN); Daoyu Wang, Beijing (CN); Yifan Ding, Beijing (CN); Hui Sun, Beijing (CN); Ziyang Zheng, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 19/062,283

(22) Filed: Feb. 25, 2025

(65) Prior Publication Data

US 2025/0328223 A1     Oct. 23, 2025

Related U.S. Application Data

(63) Continuation of application No. PCT/CN2024/088905, filed on Apr. 19, 2024.

(51) Int. Cl.
*G06F 3/04842*     (2022.01)
*G06F 3/0483*     (2013.01)
*H04L 67/55*     (2022.01)

(52) U.S. Cl.
CPC ........ *G06F 3/04842* (2013.01); *G06F 3/0483* (2013.01); *H04L 67/55* (2022.05)

(58) Field of Classification Search
CPC ..... G06F 3/04842; G06F 3/0483; H04L 67/55
See application file for complete search history.

(56) References Cited

U.S. PATENT DOCUMENTS

2019/0325084 A1    10/2019   Peng et al.
2025/0053584 A1*    2/2025   Yu ........................... H04L 51/04
2025/0055897 A1*    2/2025   Yu ....................... G06F 16/3334

FOREIGN PATENT DOCUMENTS

CN        114363714 A      4/2022
CN        116226500 A      6/2023
CN        116450010 A      7/2023
(Continued)

OTHER PUBLICATIONS

ISA China Patent Office, International Search Report Issued in Application No. PCT/CN2024/088905, Dec. 4, 2024 6 pages.
(Continued)

*Primary Examiner* — Pei Yong Weng
(74) *Attorney, Agent, or Firm* — Alleman Hall LLP

(57)     ABSTRACT

The present disclosure relates to a content posting method and device and a computer-readable storage medium, and relates to the field of computer technology. The content posting method includes: generating multimedia content to be posted by an agent according to obtained network information, wherein the multimedia content comprises related content generated according to the network information and key information in the network information; posting the multimedia content; displaying a human-machine interaction interface of the agent in response to an interactive request initiated by a user for the multimedia content; and realizing an interaction between the user and the agent based on the multimedia content in the human-computer interaction interface.

17 Claims, 6 Drawing Sheets

(56)         References Cited

FOREIGN PATENT DOCUMENTS

| | | | |
|---|---|---|---|
| CN | 116910368 | A | 10/2023 |
| CN | 117097790 | A | 11/2023 |
| CN | 117332098 | A | 1/2024 |
| CN | 117519530 | A | 2/2024 |
| CN | 117609491 | A | 2/2024 |

OTHER PUBLICATIONS

ISA China National Intellectual Property Administration, Written Opinion Issued in Application No. PCT/CN2024/088905, Dec. 4, 2024, 6 pages.
European Patent Office, Extended European Search Report Issued in Application No. 24850312.0, Sep. 5, 2025, Germany, 10 pages.
China National Intellectual Property Administration, Office Action and Search Report Issued in Application No. 202480002785.8, Nov. 25, 2025, 20 pages.

* cited by examiner

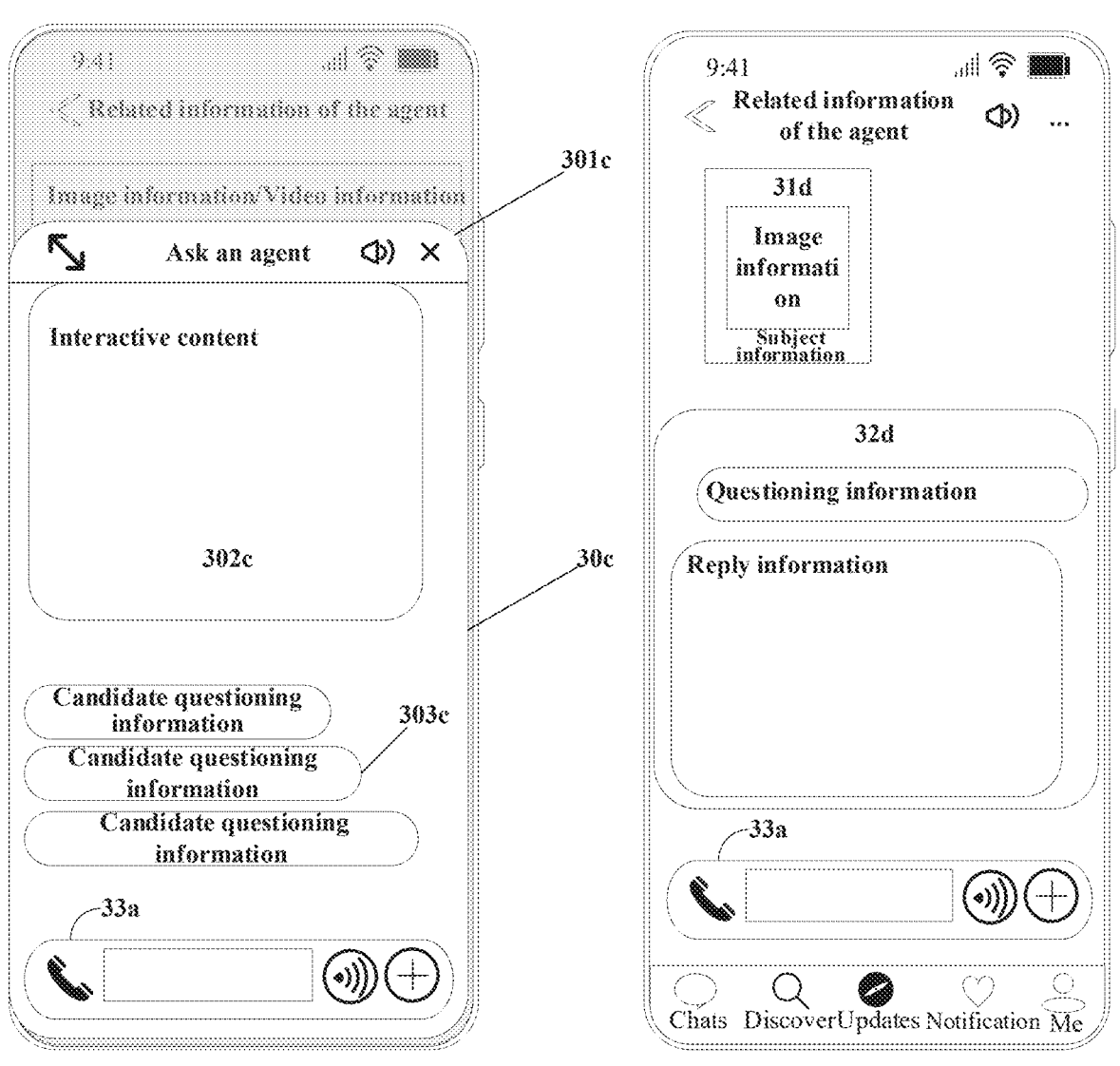
Fig. 3c                    Fig. 3d

CONTENT POSTING METHOD, DEVICE AND COMPUTER-READABLE STORAGE MEDIUM

CROSS-REFERENCE TO RELATED APPLICATIONS

This application is a U.S. National Stage Application of International Patent Application No. PCT/CN2024/088905, filed on Apr. 19, 2024, which is hereby incorporated by reference in its entirety into the present application.

TECHNICAL FIELD

The present disclosure relates to the field of computer technology, in particular to a content posting method, a content posting device, a non-transitory computer-readable storage medium, a computer program product and a computer program.

BACKGROUND

With the rapid development of Internet, there are an increasing number of network users who may browse various network information through network. Therefore, a wide range of information push may be realized by posting network information.

In the related art, network information may be pushed to the user by way of network communication such as various websites, forums and social media.

SUMMARY

According to some embodiments of the present disclosure, a content posting method is provided. The method comprises: generating the multimedia content to be posted by an agent according to the obtained network information, wherein the multimedia content comprises related content generated according to the network information and key information in the network information; posting the multimedia content; displaying a human-machine interaction interface of the agent in response to an interactive request initiated by the user for the multimedia content; and realizing the interaction between the user and the agent based on the multimedia content in the human-computer interaction interface.

In some embodiments, the key information comprises a keyword and/or image information extracted from the network information. The related content comprises subject information generated by the machine learning model according to the key information.

In some embodiments, the step of displaying a human-machine interaction interface of the agent comprises: displaying the detail information of the multimedia content in response to a selection operation for the multimedia content by the user; and displaying the human-computer interaction interface in response to an interactive operation initiated by the user for the detail information.

In some embodiments, the step of realizing the interaction between the user and the agent based on the multimedia content comprises: generating reply information according to the detail information and the questioning information in response to inputting the questioning information related to the detail information by the user in the human-computer interaction interface; and feeding back the reply information to the user in the human-computer interaction interface.

In some embodiments, the candidate questioning information for the user to select is displayed in the human-computer interaction interface, and the candidate questioning information is generated according to the historical questioning information for the multimedia content and/or generated by using the machine learning model according to the key information.

In some embodiments, the step of displaying the human-machine interaction interface comprises: displaying the human-computer interaction interface in a manner of a window in the detail page of the multimedia content; or switching from the detail page of the multimedia content to the interactive page between the user and the agent, and displaying the human-computer interaction interface in the interactive page.

In some embodiments, the detail information comprises summary information generated by using the machine learning model according to the network information.

In some embodiments, the detail information comprises at least one of link information, image information, video information or text information related to the network information.

In some embodiments, the step of displaying the detail information of the multimedia content comprises: playing the video information in the detail page of the multimedia content in response to the network information comprising video information.

In some embodiments, the posting the multimedia content comprises: posting the multimedia content as update content recommended by the agent in the network community.

In some embodiments, the posting the multimedia content comprises: adding the multimedia content to the push information stream, wherein the push information stream comprises a plurality of multimedia content from different posters.

According to other embodiments of the present disclosure, a content posting device is provided. The device comprises: a generating unit configured to generate the multimedia content to be posted by an agent according to the obtained network information, wherein the multimedia content comprises related content generated according to the network information and key information in the network information; a posting unit configured to post the multimedia content; a display unit configured to display a human-machine interaction interface of the agent in response to an interactive request initiated by the user for the multimedia content; and an interaction unit configured to realize the interaction between the user and the agent based on the multimedia content in the human-computer interaction interface.

In some embodiments, the key information comprises a keyword and/or image information extracted from the network information. The related content comprises subject information generated by the machine learning model according to the key information.

In some embodiments, the display unit displays the detail information of the multimedia content in response to a selection operation for the multimedia content by the user, and displays the human-computer interaction interface in response to initiating an interactive operation of the detail information by the user.

In some embodiments, the interaction unit generates the reply information according to the detail information and the questioning information, and feeds back the reply information to the user in the human-computer interaction interface in response to inputting the questioning information related to the detail information by the user in the human-computer interaction interface.

In some embodiments, the candidate questioning information for the user to select is displayed in the human-computer interaction interface, and the candidate questioning information is generated according to the historical questioning information for the multimedia content and/or generated by using the machine learning model according to the key information.

In some embodiments, the display unit displays the human-computer interaction interface in a manner of a window in the detail page of the multimedia content, or switches from the detail page of the multimedia content to the interaction page between the user and the agent, and displays the human-computer interaction interface in the interaction page.

In some embodiments, the detail information comprises summary information generated by using the machine learning model according to the network information.

In some embodiments, the detail information comprises at least one of link information, image information, video information or text information related to the network information.

In some embodiments, the display unit plays the video information in the detail page of the multimedia content in response to the network information comprising the video information.

In some embodiments, the posting unit posts the multimedia content as update content recommended by the agent in the network community.

In some embodiments, the posting unit adds the multimedia content to the push information stream, wherein the push information stream comprises a plurality of multimedia content from different posters.

According to yet other embodiments of the present disclosure, a content posting device is provided. The content posting device comprises: a memory; and a processor coupled to the memory, wherein the processor is configured to perform the content posting method in any some of the above-described embodiments.

According to still other embodiments of the present disclosure, a non-transitory computer readable storage medium is provided. The non-transitory computer readable storage medium has a computer program stored thereon that, when executed by a processor, implements the content posting method in any some of the above-described embodiments.

According to still other embodiments of the present disclosure, a computer program is provided. The computer program comprises instructions that, when executed by a processor, cause the processor to perform the content posting method according to any of the above-described embodiments.

According to still other embodiments of the present disclosure, a computer program product is provided. The computer program product comprises instructions that, when executed by a processor, cause the processor to perform the content posting method according to any of the above-described embodiments.

Other features and advantages of the present disclosure will become explicit from the following detailed description of exemplary embodiments of the present disclosure with reference to the accompanying drawings.

BRIEF DESCRIPTION OF THE DRAWINGS

The accompanying drawings described here which are intended to provide a further understanding of the present disclosure, constitute a part of the present application. The illustrative embodiments of the present disclosure as well as the descriptions thereof, which are intended for explaining the present disclosure, do not constitute improper definitions on the present disclosure. In the accompanying drawings:

FIGS. 3c to 3d show schematic views of a human-computer interaction interface according to some embodiments of the present disclosure;

DETAILED DESCRIPTION

Figure 1:
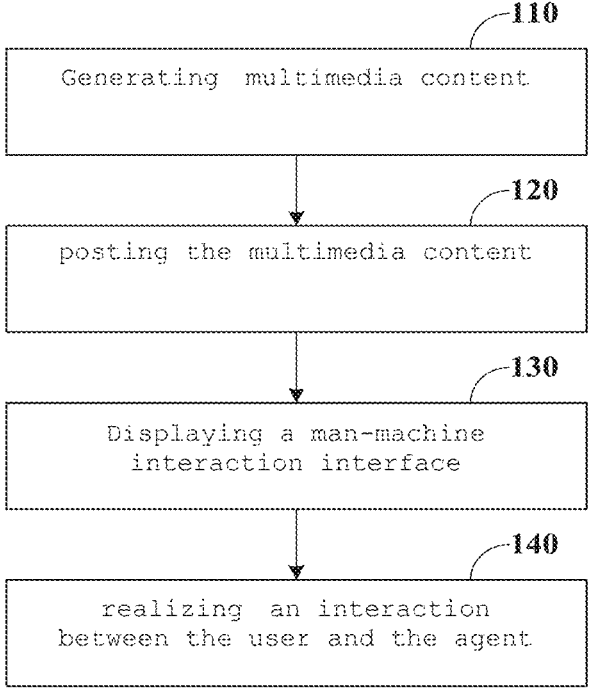
FIG. 1 shows a flowchart of a content posting method according to some embodiments of the present disclosure.

The technical solutions in the embodiments of the present disclosure will be explicitly and completely described below in conjunction with the accompanying drawings in the embodiments of the present disclosure. Apparently, the embodiments described are merely some of the embodiments of the present disclosure, rather than all of the embodiments. The following descriptions of at least one exemplary embodiment which are in fact merely illustrative, shall by no means serve as any delimitation on the present disclosure as well as its application or use. On the basis of the embodiments of the present disclosure, all the other embodiments obtained by those of ordinary skill in the art on the premise that no inventive effort is involved shall fall into the protection scope of the present disclosure.

The relative arrangements, numerical expressions and numerical values of the components and steps elaborated in these examples shall not limit the scope of the present invention unless specified otherwise. At the same time, it should be understood that, for ease of description, the dimensions of various parts shown in the accompanying drawings are not drawn according to actual proportional relations. The techniques, methods, and devices known to those of ordinary skill in the relevant art might not be discussed in detail. However, the techniques, methods, and devices shall be considered as part of the granted description where appropriate. Among all the examples shown and discussed here, any specific value shall be construed as being merely exemplary, rather than as a restriction. Thus, other examples in the exemplary embodiments may have different values. It is to be noted that: similar reference numerals and letters present similar items in the following accompanying drawings, and therefore, once an item is defined in one accompanying drawing, a further discussion thereof is not required in the subsequent accompanying drawings.

The inventors of the present disclosure have found that, the above-described related art is present with the following problem: since there is a huge amount of network information posted to the public, it is difficult for the user to find out the network information of interest from the massive network information, which results in a low information push efficiency. In view of this, the present disclosure provides a technical solution of content posting, which may improve the information push efficiency.

For example, the technical solution of the present disclosure may be realized by the following embodiments.

FIG. 1 shows a flowchart of a content posting method according to some embodiments of the present disclosure.

As shown in FIG. 1, in Step 110, generating multimedia content to be posted by an agent according to obtained network information, wherein the multimedia content comprises related content generated according to the network information and key information in the network information.

In Step 120, posting the multimedia content.

In Step 130, displaying a human-machine interaction interface of the agent in response to an interactive request initiated by a user for the multimedia content.

In Step 140, realizing an interaction between the user and the agent based on the multimedia content in the human-computer interaction interface.

In the above-described embodiments, the agent processes the network information to generate the multimedia content to be browsed by the user, and may interact with the user for the multimedia content. In this way, it is not only beneficial to rapidly filter the network information of interest from the massive network information, but also possible to provide an interactive interface for further understanding the network information, thereby improving the information push efficiency.

In some embodiments, the agent may obtain network information such as news, information and blog posts through network sources such as websites, forums and social media, and extract key information from the network information and/or generate related content of the network information. For example, the extracted key information may comprise keywords and/or image information extracted from the network information. The generated related content comprises subject information generated by using the machine learning model according to the key information.

For example, the agent obtained a piece of news about the revenue of XX company from the website as the network information. The agent extracts a plurality of keywords therein from the network information by artificial intelligence (for example, a machine learning model with natural language processing capability or the like), for example, "XX Company", "Fourth quarter", "Profit decline" and "40%" as the key information of the network information. According to these keywords, the agent generates the subject information "The profit of XX company in the fourth quarter declines by 40%" as the related content of the network information through the machine learning model.

For another example, the agent obtains a piece of news about the revenue of XX company from the website as the network information. The agent detects that the network information comprises at least one image using artificial intelligence (for example, a machine learning model with image processing capability or the like), and extracts the at least one image as the key information of the network information, so as to intuitively display the key content of the network information, thereby improving the information push efficiency. For example, the at least one image may comprise a main product map, a revenue statistics diagram and the like of XX Company.

In addition, exemplarily, the agent may also extract the feature information of an image in the network information using a machine learning model with image processing capability, and generate the subject information of the network information according to the feature information. In this way, it is possible to increase the correlation between the displayed subject information and the network information, thereby improving the information push efficiency.

In the above-described embodiments, the agent processes the network information by using the machine learning model, and generates the multimedia content comprising the key content of the network information. In this way, it is possible to display the key content of the lengthy network information to the user with concise information, which improves the information push efficiency.

After generating the multimedia content by any of the above-described embodiments, the agent may post the multimedia content on the network by the following embodiments, so that the user may browse the multimedia content.

In some embodiments, the agent may post the generated multimedia content in the network community as update content recommended by the agent. For example, the agent may post the generated multimedia content to the update display page or the content recommendation page of the agent for display. Exemplarily, in response to the agent needing to post update content, the multimedia content may be generated as update content to be posted according to the obtained network information, and the update content may comprise videos, image with text and the like. For example, each update content may correspond to an item of network information.

For example, the agent may also add the generated multimedia content into the push information stream, wherein the push information stream also comprises a plurality of multimedia content from different posters. Exemplarily, the agent may generate a plurality of multimedia content to form a push information stream to be consumed by the user.

Hereinafter, the posting of the multimedia content is exemplified by the embodiments in FIGS. 2*a*-2*b*.

Figure 2A:
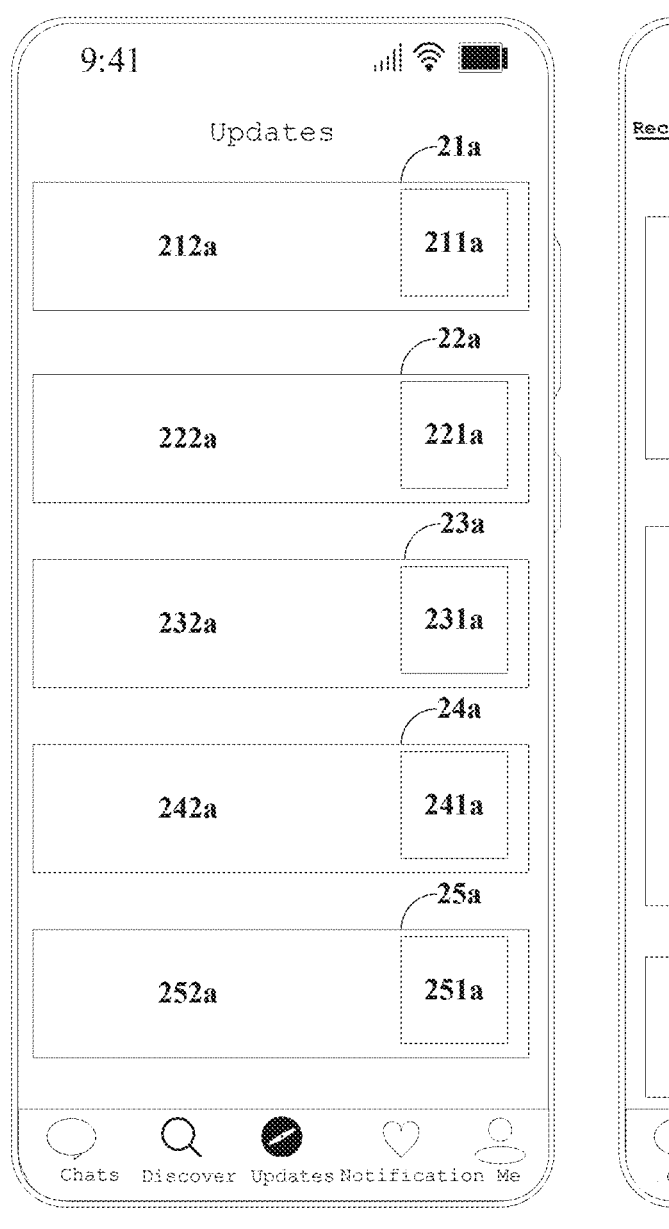
FIGS. 2a to 2b show schematic views of a multimedia content posting method according to some embodiments of the present disclosure.
Figure 2B:
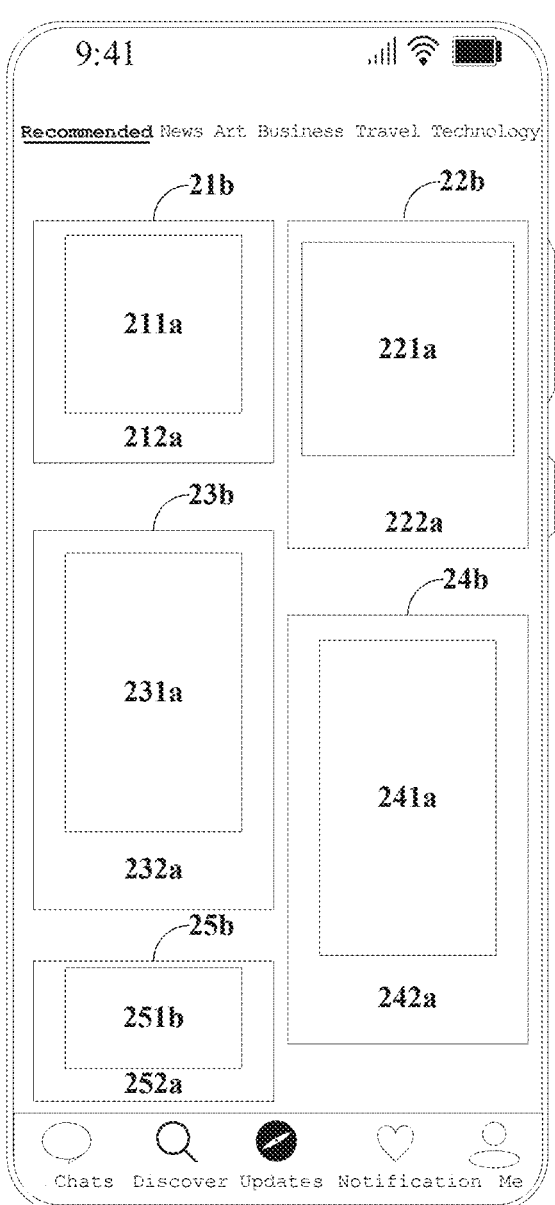

FIGS. 2*a* to 2*b* show schematic views of a multimedia content posting method according to some embodiments of the present disclosure.

As shown in FIG. 2*a*, the agent obtains a plurality of network information and generates a plurality of multimedia content through network sources such as websites, forums and social media. The agent posts these multimedia content in a manner of update content in the update display page of the agent, which comprises update content 21*a* to 25*a*.

For example, the agent may extract a keyword and image information from each of network information obtained as the key information, and generate the subject information of each of network information as the related content. As shown in FIG. 2*a*, the update content 21*a* comprises image information 211*a* extracted from the corresponding network information, and subject information 212*a* generated by using the machine learning model according to the image information 211*a* and/or a keyword of the corresponding network information. Similarly, the update content 22*a* comprises image information 221*a* and subject information 222*a*, the update content 23*a* comprises image information 231*a* and subject information 232*a*, the update content 24*a* comprises image information 241*a* and subject information 242*a*, and the update content 25*a* comprises image information 251*a* and subject information 252*a*.

As shown in FIG. 2*b*, the agent may also post the multimedia content in a manner of recommended content in the content recommendation page of the agent, which comprises recommended content 21*b*-25*b*.

For example, the agent may extract a keyword and an image information from each of network information obtained as the key information, and generate the subject information of each of network information as the related content. As shown in FIG. 2b, the recommended content 21b comprises image information 211a extracted from the corresponding network information, and subject information 212a generated by using the machine learning model according to the image information 211a and/or a keyword of the corresponding network information. Similarly, the recommended content 22b comprises image information 221a and subject information 222a, the recommended content 23b comprises image information 231a and subject information 232a, the recommended content 24b comprises image information 241a and subject information 242a, and the recommended content 25b comprises image information 251a and subject information 252a.

In the above-described embodiments, the agent processes the network information by using the machine learning model, and generates the multimedia content comprising the key content of the network information. In this way, it is possible to intuitively display the key content of lengthy network information to the user with concise information (for example, image information 211a, subject information 212a and the like), which improves the information push efficiency.

After posting the multimedia content by any of the above-described embodiments, the user may browse detail information of the multimedia content of interest by the following embodiments.

In some embodiments, the detail information of the multimedia content is displayed in response to a selection operation for the multimedia content by the user. For example, the detail information comprises summary information generated by the machine learning model according to the network information corresponding to the multimedia content. The machine learning model may be a machine learning model with natural language processing capability. For another example, the detail information may also comprise at least one of link information, image information, video information or text information related to the network information corresponding to the multimedia content. The machine learning model may be used to extract link information, image information, video information, text information and the like from the network information.

Hereinafter, a method of displaying detail information of the multimedia content to the user is exemplified by the embodiments in FIGS. 3a to 3b.

Figure 3A:
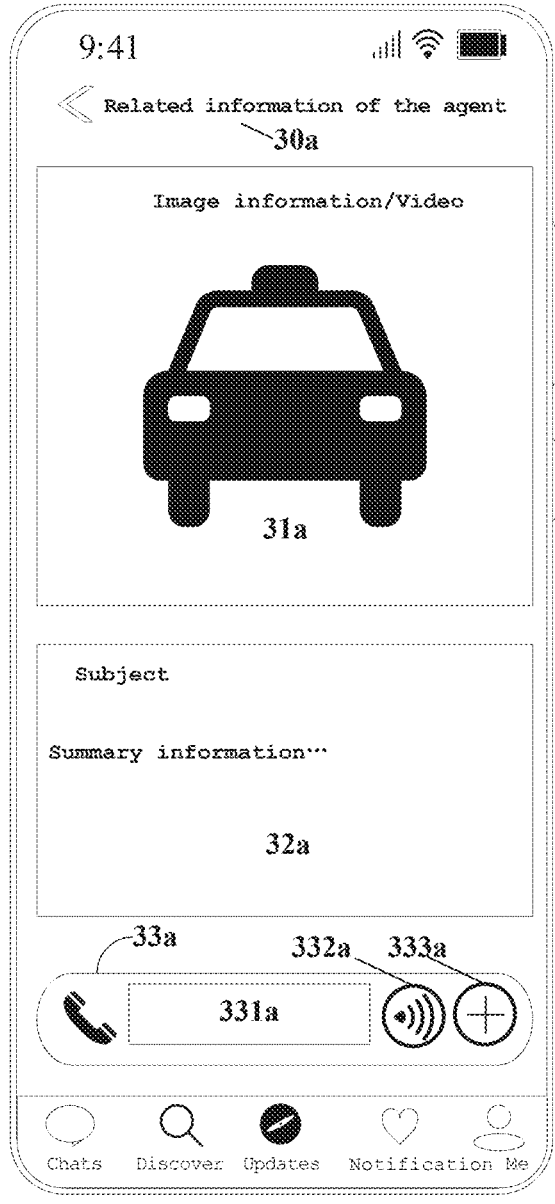
FIGS. 3a to 3b show schematic views of a detail information display interface according to some embodiments of the present disclosure.
Figure 3B:
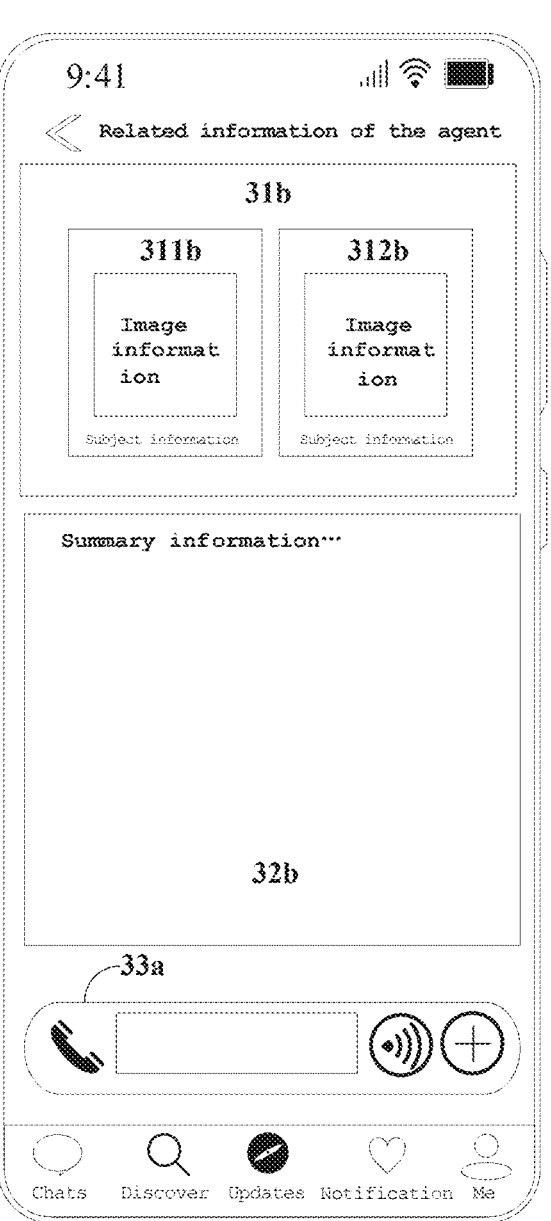

FIGS. 3a to 3b show schematic views of a detail information display interface according to some embodiments of the present disclosure.

As shown in FIG. 3a, in response to selecting one of the multimedia content in the update display page or the content recommendation page of the agent by the user, switch from the update display page or the content recommendation page to the detail page. The detail page may comprise an image information display area 31a and a text information display area 32a. The detail page may also comprise an agent-related information display area 30a configured to display the related information of the agent posting the multimedia content, which comprises the name, identity image and the like of the agent.

The video information display area 31a may be configured to display image information, video information and the like related to the network information corresponding to the multimedia content. The text information display area 32a may be configured to display text information corresponding to the network information corresponding to the multimedia content, for example, summary information generated by the machine learning model according to the network information corresponding to the multimedia content, subject information generated by the machine learning model according to the key information of the network information corresponding to the multimedia content, link information related to the network information corresponding to the multimedia content, and the like.

Exemplarily, the detail information of the multimedia content selected by the user may comprise: image information related to the network information corresponding to the multimedia content; and summary information generated by the machine learning model according to the network information corresponding to the multimedia content. As shown in FIG. 3a, image information related to the network information corresponding to the multimedia content may be displayed in the image information display area 31a. The text information display area 32a may display summary information of the network information corresponding to the multimedia content and subject information of the multimedia content.

In this way, it is possible to display the key content of the network information of interest to the user in a concise and intuitive manner (for example, subject information, summary information, image information and the like), which improves the information push efficiency.

In some embodiments, in response to the network information comprising video information, the video information is played in the detail page of the multimedia content. For example, the network information corresponding to the multimedia content selected by the user comprises video information, and in response to the user entering the detail page of the multimedia content, the video information is played in the video information display area 31a, so that the user may rapidly understand the network information, thereby improving the information push efficiency.

As shown in FIG. 3b, in response to selecting the multimedia content 311b in the update display page or the content recommendation page of the agent by the user, switch from the update display page or the content recommendation page to the detail page for displaying the detail information of the multimedia content 311b. The detail page may comprise a multimedia content display area 31b and a text information display area 32b. The detail page may also comprise subject information generated by the machine learning model according to the key information of the network information corresponding to the multimedia content 311b.

For example, the multimedia content display area 31b may be configured to display the multimedia content 311b selected by the user. The multimedia content 311b comprises image information related to the network information corresponding to the multimedia content 311b, and subject information generated by using the machine learning model according to the key information of the network information corresponding to the multimedia content 311b.

For example, the multimedia content display area 31b may also be configured to display other multimedia content correlated with the multimedia content 311b, for example, the multimedia content 312b. The multimedia content 312b comprises image information related to the network information corresponding to the multimedia content 312b, and subject information generated by using the machine learning model according to the key information of the network information corresponding to the multimedia content 312b. In response to a selection operation for the multimedia content 312b by the user, it is possible to switch from the detail page of the multimedia content 311b to the detail page of the multimedia content 312b.

In this way, other multimedia content of potential interest to the user may be displayed during the process of browsing the multimedia content of interest by the user, thereby improving the information push efficiency.

For example, the text information display area 32*b* may be configured to display text information corresponding to the network information corresponding to the multimedia content 311*b*, for example, summary information generated by using the machine learning model according to the network information corresponding to the multimedia content 311*b*.

In the above-described embodiments, it is possible to display the key content of the network information of interest to the user in a concise and intuitive manner (for example, subject information, summary information, image information and the like), which improves the information push efficiency.

On the basis of displaying detail information of the multimedia content of interest to the user by any of the above-described embodiments, a human-computer interaction interface may be displayed in response to an interactive operation initiated by the user so that the user interacts with the agent for the multimedia content. For example, in response to operating an interactive control in the display page of the detail information by the user, the human-computer interaction interface is displayed.

Hereinafter, a triggering method of a human-computer interaction interface will be exemplified by the embodiments in FIG. 3*a*.

As shown in FIG. 3*a*, in response to selecting one of the multimedia content in the update display page or the content recommendation page of the agent by the user, switch from the update display page or the content recommendation page to the detail page. The detail page comprises an interactive control 33*a* for displaying a human-computer interaction interface in response to an operation on the interactive control 33*a* by the user.

For example, the user may trigger displaying the human-computer interaction interface by initiating a questioning operation. For example, the interactive control 33*a* may comprise a text input area 331*a* for inputting questioning information so that a human-computer interaction interface is displayed in response to selecting the text input area 331*a* by the user. The text input area 331*a* may also be configured to display the candidate questioning information for the user to select so that a human-computer interaction interface is displayed in response to selecting the candidate questioning information in the text input area 331*a* by the user. Exemplarily, the candidate questioning information is generated by using the machine learning model according to the historical questioning information for the multimedia content and/or according to the key information.

For example, the interactive control 33*a* may further comprise a voice input control 332*a* for voice input of questioning information. In response to inputting a questioning voice by the user using the voice input control 332*a*, a human-computer interaction interface is displayed so that a control for playing the questioning voice may be displayed in the human-computer interaction interface. For example, the interactive control 33*a* may further comprise an insertion control 333*a* for inserting a multimedia file such as an image and a video into the questioning information. In response to inserting a multimedia file by the user using the insert control 333*a*, a human-computer interaction interface is displayed so that a thumbnail of the multimedia file may be displayed in the human-computer interaction interface.

In this way, the user may interact with the poster in time for the multimedia content of interest, thereby improving the information push efficiency.

After the human-computer interaction interface is triggered by any of the above-described embodiments, the user may interact with the agent for the multimedia content based on the human-computer interaction interface by the following embodiments.

In some embodiments, in response to inputting the questioning information related to the detail information by the user in the human-computer interaction interface, reply information is generated according to the detail information and the questioning information. In the human-computer interaction interface, the reply information is fed back to the user. For example, the user may input the questioning information related to the detail information in the human-computer interaction interface by way of voice input, text input and the like. According to the user input and the questioning information, the agent generates the reply information by using the machine learning model, and feeds back the reply information to the user by way of voice reply, text reply and the like.

In this way, the user may interact with the poster in time for the multimedia content of interest, thereby improving the information push efficiency.

In some embodiments, the candidate questioning information for the user to select is displayed in the human-computer interaction interface. The candidate questioning information may be generated according to the historical questioning information for the multimedia content and/or the key information using the machine learning model. For example, the agent may obtain the historical questioning information of the network information corresponding to the multimedia content through network as the candidate questioning information. The agent may also take at least one historical questioning information with the most occurrence times as the candidate questioning information by counting the occurrence times of each historical questioning information. For example, the candidate questioning information may be displayed in the interactive interface for selection by the user, and in response to selecting one of the candidate questioning information by the user, the agent replies to the candidate questioning information.

In this way, the user may rapidly ask a question for the multimedia content of interest, thereby improving the information push efficiency.

In some embodiments, in the detail page of the multimedia content, the human- computer interaction interface is displayed in a manner of a window. Alternatively, switch from the detail page of the multimedia content to the interactive page between the user and the agent, and display the human-computer interaction interface in the interactive page.

Hereinafter, the related technical solution of the human-computer interaction interface is exemplified by the embodiments in FIGS. 3*c* to 3*d*.

FIGS. 3*c* to 3*d* show schematic views of a human-computer interaction interface according to some embodiments of the present disclosure.

As shown in FIG. 3*c*, in response to a triggering operation on the interactive control 33*a* by the user in the detail page of any of the above-described embodiments, the man-machine interactive interface 301*c* is displayed in the detail page of the multimedia content in a manner of a window. For example, the human-computer interaction interface 301*c* may pop up in a manner of a window from a position (for example, the bottom, top, side or the like) of the detail information display interface, and the human-computer interaction interface 301c may be overlayed on the detail information display interface in the detail page.

For example, the human-computer interaction interface 301c may comprise an interactive content display area 302c for displaying the interactive content between the user and the agent. The interactive content may comprise the user's questioning information about the current multimedia content and the agent's reply information to the questioning information.

For example, the human-computer interaction interface 301c may comprise a candidate questioning information display area 303c for displaying at least one candidate questioning information about the current multimedia content. Exemplarily, in response to selecting one of the candidate questioning information by the user, the candidate questioning information may be displayed in the interactive content display area 302c. The agent replies to the candidate questioning information and displays the reply information in the interactive content display area 302c.

For example, the human-computer interaction interface 301c may comprise a controlling control of a pop-up window. As shown in FIG. 3c, the double arrow control is configured to display the human-computer interaction interface 301c in full screen. The x-shaped control in FIG. 3c is configured to close the human-computer interaction interface 301c and resume displaying the detail information display interface overlayed by the human-computer interaction interface 301c.

As shown in FIG. 3d, in response to a triggering operation on the interactive control 33a by the user in the detail page of any of the above-described embodiments, switch from the detail page of the multimedia content to the interactive page between the user and the agent, and display the human-computer interaction interface in the interactive page. For example, the human-computer interaction interface may comprise a multimedia content display area 31d for displaying the current multimedia content (the image information, the subject information or the like).

For example, the human-computer interaction interface may comprise an interactive content display area 32d for displaying the interactive content between the user and the agent. The interactive content may comprise the user's questioning information about the current multimedia content and the agent's reply information to the questioning information.

In the above-described embodiments, the user may interact with the poster in time for the multimedia content of interest, thereby improving the information push efficiency.

Figure 4:
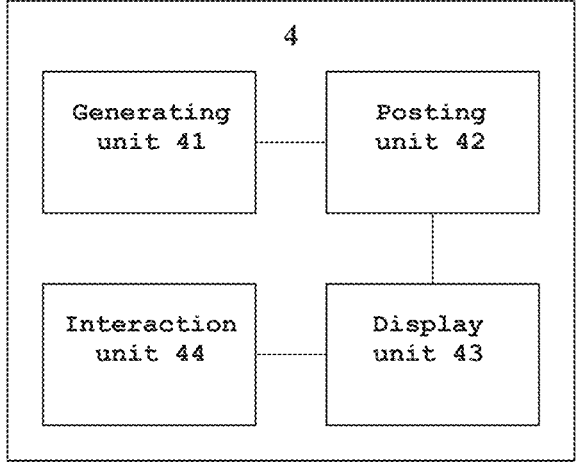
FIG. 4 shows a block diagram of a content posting device according to some embodiments of the present disclosure.

FIG. 4 shows a block diagram of a content posting device according to some embodiments of the present disclosure.

As shown in FIG. 4, the content posting device 4 comprises: a generating unit 41 for generating the multimedia content to be posted by the agent according to the obtained network information, wherein the multimedia content comprises related content generated according to the network information and key information in the network information; a posting unit 42 for posting the multimedia content; a display unit 43 configured to display the human-machine interaction interface of the agent in response to the interactive request initiated by the user for the multimedia content; an interaction unit 44 configured to realize the interaction between the user and the agent based on the multimedia content in the human-computer interaction interface.

In some embodiments, the key information comprises a keyword and/or image information extracted from the network information. The related content comprises subject information generated by the machine learning model according to the key information.

In some embodiments, the display unit 43 displays the detail information of the multimedia content in response to a selection operation for the multimedia content by the user, and displays the human-computer interaction interface in response to initiating an interactive operation of the detail information by the user.

In some embodiments, the interaction unit 44 generates the reply information according to the detail information and the questioning information, and feeds back the reply information to the user in the human-computer interaction interface in response to inputting the questioning information related to the detail information by the user in the human-computer interaction interface.

In some embodiments, the candidate questioning information for the user to select is displayed in the human-computer interaction interface, and the candidate questioning information is generated according to the historical questioning information for the multimedia content and/or generated by using the machine learning model according to the key information.

In some embodiments, the display unit 43 displays the human-computer interaction interface in a manner of a window in the detail page of the multimedia content, or switches from the detail page of the multimedia content to the interaction page between the user and the agent, and displays the human-computer interaction interface in the interaction page.

In some embodiments, the detail information comprises summary information generated by using the machine learning model according to the network information.

In some embodiments, the detail information comprises at least one of link information, image information, video information or text information related to the network information.

In some embodiments, the display unit 43 plays the video information in the detail page of the multimedia content in response to the network information comprising the video information.

In some embodiments, the posting unit 44 posts the multimedia content as update content recommended by the agent in the network community.

In some embodiments, the posting unit 42 adds the multimedia content to the push information stream, wherein the push information stream comprises a plurality of multimedia content from different posters.

In the above-described embodiments, the agent processes the network information to generate the multimedia content to be browsed by the user, and may interact with the user for the multimedia content. In this way, it is not only beneficial to rapidly screen out the network information of interest from the massive network information, but also possible to provide an interactive interface for further understanding the network information, thereby improving the information push efficiency. In addition, the user may interact with the poster in time for the multimedia content of interest, thereby improving the information push efficiency.

Figure 5:
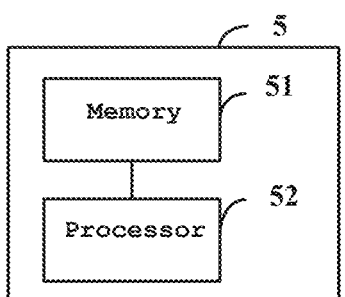
FIG. 5 shows a block diagram of a content posting device according to other embodiments of the present disclosure.

FIG. 5 shows a block diagram of a content posting device according to other embodiments of the present disclosure.

As shown in FIG. 5, the content posting device 5 in this embodiment comprises: a memory 51; and a processor 52 coupled to the memory 51, wherein the processor 52 is configured to perform the content posting method according to any embodiment of the present disclosure based on instructions stored in the memory 51.

Wherein, the memory 51 may comprise, for example, a system memory, a fixed non-volatile storage medium, or the like. The system memory stores, for example, an operation system, an application program, a boot loader, a database and other programs.

Figure 6:
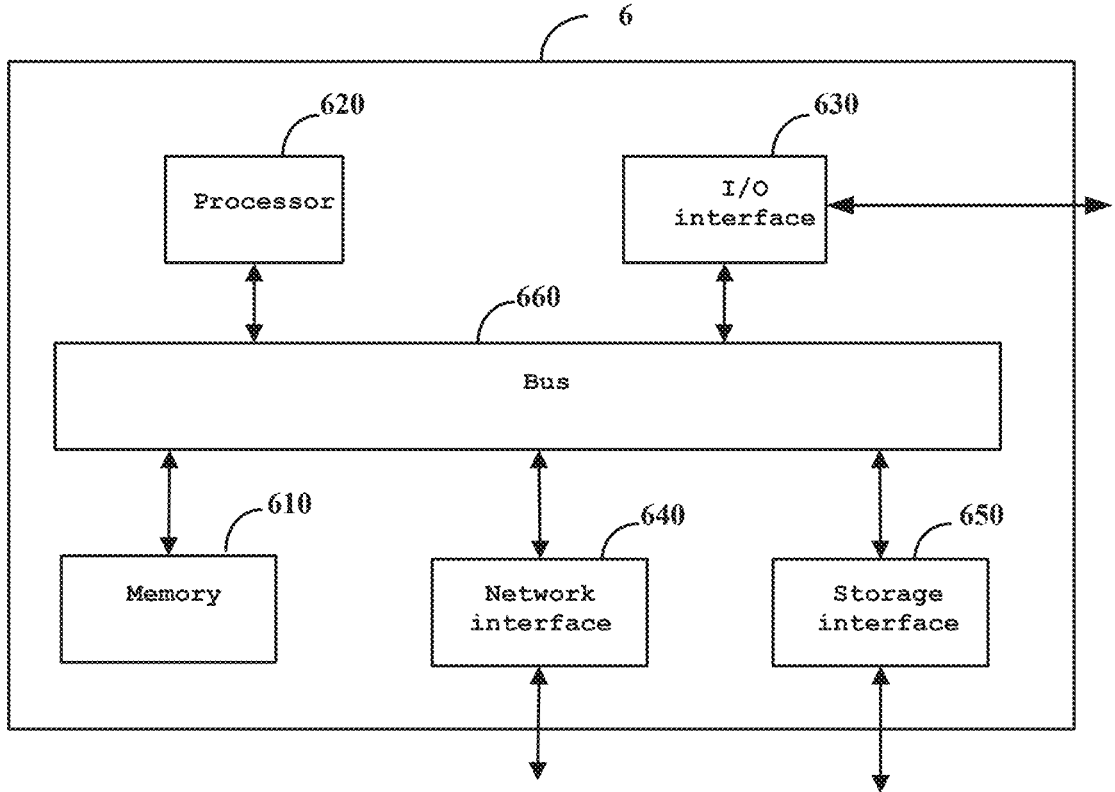
FIG. 6 shows a block diagram of a content posting device according to yet other embodiments of the present disclosure.

FIG. 6 shows a block diagram of a content posting device according to yet other embodiments of the present disclosure.

As shown in FIG. 6, the content posting device 6 in this embodiment comprises: a memory 610; and a processor 620 coupled to the memory 610, wherein the processor 620 is configured to perform the content posting method according to any of the foregoing embodiments based on the instructions stored in the memory 610.

The memory 610 may comprise, for example, a system memory, a fixed non-volatile storage medium, and the like. The system memory stores, for example, an operation system, an application program, a boot loader, and other programs.

The content posting device 6 may further comprise an I/O interface 630, a network interface 640, a storage interface 650, and the like. These interfaces 630, 640, 650 as well as the memory 610 and the processor 620 therebetween may be connected, for example, via a bus 660. Wherein, the I/O interface 630 provides a connection interface for input and output devices such as a display, a mouse, a keyboard, a touch screen, a microphone and a speaker. The network interface 640 provides a connection interface for various networked devices. The storage interface 650 provides a connection interface for an external storage device such as an SD card or a USB flash disk.

Those skilled in the art will appreciate that the embodiments of the present disclosure may be provided as a method, system, or computer program product. Therefore, the present disclosure may take the form of a hardware only embodiment, a software only embodiment, or an embodiment combining software and hardware aspects. Moreover, the present disclosure may take the form of a computer program product implemented in one or more computer-usable non-transitory storage media (comprising but not limited to a disk memory, CD-ROM, an optical memory, and the like) containing computer usable program codes therein.

Hereto, various embodiments according to the present disclosure have been described in detail. In order to avoid obscuring the concept of the present disclosure, some details commonly known in the art have not been described. From the above descriptions, those skilled in the art may fully understand how to implement the technical solutions disclosed here.

The method and system of the present disclosure might be implemented in many methods. For example, the method and system of the present disclosure may be implemented by software, hardware, firmware, or any combination of software, hardware, and firmware. The above-described sequence for the steps of the above-described method is merely for an illustrative purpose, and the steps of the method of the present disclosure are not limited to the sequence specifically described above unless specified otherwise. Moreover, in some embodiments, the present disclosure may also be embodied as programs recorded in a recording medium, which comprise machine readable instructions for implementing the method according to the present disclosure. Accordingly, the present disclosure also covers a recording medium that stores programs for performing the method according to the present disclosure.

Although some specific embodiments of the present disclosure have been described in detail exemplarily, those skilled in the art should understand that the above examples are only for an illustrative purpose, rather than limiting the scope of the present disclosure. Those skilled in the art should appreciate that modifications to the above-described embodiments may be made without departing from the scope and spirit of the present disclosure. The scope of present disclosure is defined by the appended claims.

What is claimed is:

1. A content posting method, comprising:
generating multimedia content to be posted by an agent according to obtained network information, wherein the multimedia content comprises related content generated according to the network information and key information in the network information, the key information comprises at least one of a keyword or image information, and the related content comprises subject information;
posting the multimedia content;
displaying a human-machine interaction interface of the agent in response to an interactive request initiated by a user for the multimedia content; and
realizing an interaction between the user and the agent based on the multimedia content in the human-machine interaction interface,
wherein the posting the multimedia content comprises:
adding the multimedia content to a push information stream, wherein the push information stream comprises a plurality of multimedia content from different posters.

2. The content posting method according to claim 1, wherein the displaying the human-machine interaction interface of the agent comprises:
displaying detail information of the multimedia content in response to a selection operation for the multimedia content by the user; and
displaying the human-machine interaction interface in response to an interactive operation initiated by the user for the detail information.

3. The content posting method according to claim 2, wherein the realizing the interaction between the user and the agent based on the multimedia content comprises:
generating, in response to inputting questioning information related to the detail information by the user in the human-machine interaction interface, reply information according to the detail information and the questioning information; and
feeding back the reply information to the user in the human-machine interaction interface.

4. The content posting method according to claim 3, wherein candidate questioning information for the user to select is displayed in the human-machine interaction interface, and the candidate questioning information is generated according to historical questioning information for the multimedia content and/or generated by using a machine learning model according to the key information.

5. The content posting method according to claim 2, wherein the displaying the human-machine interaction interface comprises:
displaying the human-machine interaction interface in a manner of a window in a detail page of the multimedia content; or
switching from the detail page of the multimedia content to an interactive page between the user and the agent, and displaying the human-machine interaction interface in the interactive page.

6. The content posting method according to claim 2, wherein the detail information comprises summary information generated by using a machine learning model according to the network information.

7. The content posting method according to claim 2, wherein the detail information comprises at least one of link information, image information, video information or text information related to the network information.

8. The content posting method according to claim 2, wherein the displaying the detail information of the multimedia content comprises:

playing video information in a detail page of the multimedia content in response to the network information comprising the video information.

9. The content posting method according to claim 1, wherein the posting the multimedia content comprises:

posting the multimedia content as update content recommended by the agent in a network community.

10. A content posting device, comprising:

a memory; and a processor coupled to the memory, wherein the processor is configured to perform a content posting method according to based on instructions stored in the memory, comprising:

generating multimedia content to be posted by an agent according to obtained network information, wherein the multimedia content comprises related content generated according to the network information and key information in the network information, the key information comprises at least one of a keyword or image information, and the related content comprises subject information;

posting the multimedia content;

displaying a human-machine interaction interface of the agent in response to an interactive request initiated by a user for the multimedia content; and realizing an interaction between the user and the agent based on the multimedia content in the human-machine interaction interface, wherein the posting the multimedia content comprises:

adding the multimedia content to a push information stream, wherein the push information stream comprises a plurality of multimedia content from different posters.

11. The content posting device according to claim 10, wherein the processor performs following steps:

displaying detail information of the multimedia content in response to a selection operation for the multimedia content by the user; and displaying the human-machine interaction interface in response to an interactive operation initiated by the user for the detail information.

12. The content posting device according to claim 11, wherein the processor performs following steps:

generating, in response to inputting questioning information related to the detail information by the user in the human-machine interaction interface, reply information according to the detail information and the questioning information; and feeding back the reply information to the user in the human-machine interaction interface.

13. The content posting device according to claim 12, wherein candidate questioning information for the user to select is displayed in the human-machine interaction interface, and the candidate questioning information is generated according to historical questioning information for the multimedia content and/or generated by using a machine learning model according to the key information.

14. The content posting device according to claim 11, wherein the processor performs following steps:

displaying the human-machine interaction interface in a manner of a window in a detail page of the multimedia content; or switching from the detail page of the multimedia content to an interactive page between the user and the agent, and displaying the human-machine interaction interface in the interactive page.

15. The content posting device according to claim 11, wherein the detail information comprises summary information generated by using a machine learning model according to the network information.

16. The content posting device according to claim 11, wherein the detail information comprises at least one of link information, image information, video information or text information related to the network information.

17. A non-transitory computer readable storage medium, having a computer program stored thereon that, when executed by a processor, implements a content posting method, comprising:

generating multimedia content to be posted by an agent according to obtained network information, wherein the multimedia content comprises related content generated according to the network information and key information in the network information, the key information comprises at least one of a keyword or image information, and the related content comprises subject information;

posting the multimedia content;

displaying a human-machine interaction interface of the agent in response to an interactive request initiated by a user for the multimedia content; and realizing an interaction between the user and the agent based on the multimedia content in the human-machine interaction interface, wherein the posting the multimedia content comprises:

adding the multimedia content to a push information stream, wherein the push information stream comprises a plurality of multimedia content from different posters.

* * * * *